No. 666,956.  
E. N. DICKERSON.  
ELECTRIC CONNECTING HANDLE FOR AUTOMOBILES.  
(Application filed Nov. 5, 1900.)
Patented Jan. 29, 1901.
(No Model.)
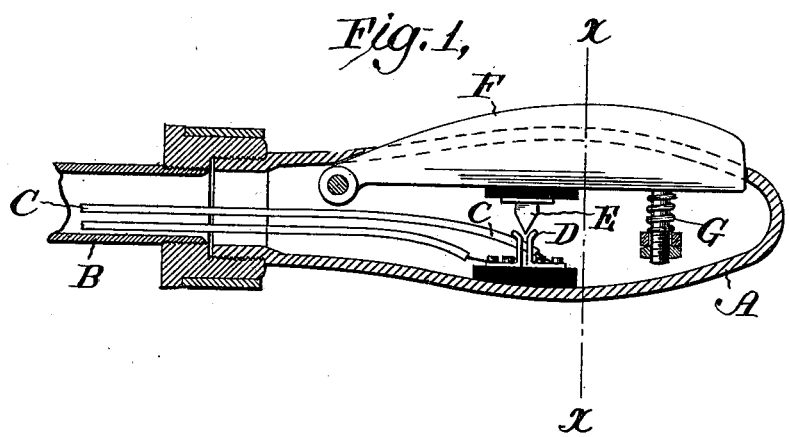
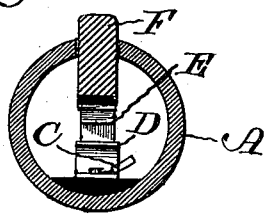
WITNESSES:  
D. H. Hayward  
Charles S. Jones.
INVENTOR  
Edward N. Dickerson  
BY Harry Courtant  
his ATTORNEY

UNITED STATES PATENT OFFICE.

EDWARD N. DICKERSON, OF STOVALL, NORTH CAROLINA.

ELECTRIC CONNECTING-HANDLE FOR AUTOMOBILES.

SPECIFICATION forming part of Letters Patent No. 666,956, dated January 29, 1901.

Application filed November 5, 1900. Serial No. 35,456. (No model.)

*To all whom it may concern:*

Be it known that I, EDWARD N. DICKERSON, of Stovall, Granville county, State of North Carolina, have invented a new and useful Improvement in Electric Connecting-Handles for Automobiles, of which the following is a full, true, and exact description, reference being had to the accompanying drawings.

In the ordinary type of motocycles the electric connection which causes the explosion is carried through the steering handle-bar, and by unscrewing the handle the circuit is broken. This method is disadvantageous, for the reason that the operator may leave the vehicle and fail to disconnect the electricity, thereby ruining the battery, or if he is thrown from the vehicle the mechanism may continue in operation. By my improvement the electric connection is only made so long as the hand of the operator is on the handle-bar.

My invention will be readily understood from the accompanying drawings, in which—

Figure I represents a cross-section, and Fig. II a cross-section through Fig. I on the line $xx$.

A represents the ordinary handle-bar.

B C are the electric wires to be connected and disconnected. They are arranged in the fixed part of the handle-bar, where they connect with two springs D, normally disconnected from each other. A wedge E is provided attached to a pivoted part F of the handle-bar, normally raised by spring G. When the handle-bar is grasped, the part F is depressed, forcing the wedge E between the springs D, and thereby completing the electric connection. When the hand is removed, the connection is broken, as is plainly seen in Fig. I.

What I claim as my invention, and desire to secure by Letters Patent, is—

1. A handle-bar for vehicles operated or controlled by the electric current, the breaking and making of which electric current stops and starts the vehicle, a movable part provided with an electric connection, normally out of contact with the electric connection, through which the controlling or operating current flows, thereby arresting the motion of the vehicle, but capable of completing the electric circuit by the pressure of the hand of the operator, thereby again putting the vehicle in motion, the said connection being, however, automatically broken when the pressure of the hand is removed, thereby arresting the motion of the vehicle, substantially as described.

2. The combination in a handle-bar for vehicles operated or controlled by the electric current, of a pivoted portion F, fixed portion A, the springs D, in electric connection with the control, the wedge E, attached to the movable portion, and the spring G, for normally separating the wedge E from the springs or connections D, substantially as described.

In testimony whereof I have signed my name to this specification in the presence of two subscribing witnesses.

E. N. DICKERSON.

Witnesses:
JULIUS J. SUCKERT,
CHARLES S. JONES.